United States Patent
Burris et al.

(10) Patent No.: US 11,238,859 B2
(45) Date of Patent: Feb. 1, 2022

(54) VOICE-BASED TRANSACTION PROCESSING WITH LOCATION-BASED ACTIVATION

(71) Applicant: NCR Corporation, Atlanta, GA (US)

(72) Inventors: Matthew Robert Burris, Atlanta, GA (US); Shelby Frances Apps, Atlanta, GA (US); Andrew Cohen, Chamblee, GA (US); Gary C. Dalton, Lawrenceville, GA (US); Jason Robert Dyer, Indianapolis, IN (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 262 days.

(21) Appl. No.: 16/456,252

(22) Filed: Jun. 28, 2019

(65) Prior Publication Data

US 2020/0410994 A1 Dec. 31, 2020

(51) Int. Cl.
*G10L 15/00* (2013.01)
*G10L 15/22* (2006.01)
*G06Q 30/06* (2012.01)
*G06Q 20/32* (2012.01)

(52) U.S. Cl.
CPC .......... *G10L 15/22* (2013.01); *G06Q 20/3224* (2013.01); *G06Q 30/0635* (2013.01); *G10L 2015/223* (2013.01)

(58) Field of Classification Search
CPC ......... G06F 3/167; G10L 15/22; G06Q 30/00; G06Q 30/0261
See application file for complete search history.

(56) References Cited

U.S. PATENT DOCUMENTS

| 6,341,264 | B1* | 1/2002 | Kuhn | G06Q 30/06 704/236 |
| 2002/0082838 | A1* | 6/2002 | Hinde | G10L 15/30 704/270.1 |
| 2002/0143550 | A1* | 10/2002 | Nakatsuyama | G10L 15/26 704/270.1 |
| 2002/0161647 | A1* | 10/2002 | Gailey | H04M 3/4936 705/14.23 |
| 2004/0243417 | A9* | 12/2004 | Pitts | G06Q 30/02 704/276 |
| 2016/0180360 | A1* | 6/2016 | Tietzen | G06Q 30/0201 705/7.32 |

(Continued)

*Primary Examiner* — Daniel Abebe
(74) *Attorney, Agent, or Firm* — Schwegman, Lundberg & Woessner

(57) ABSTRACT

A natural-language voice chatbot is initiated and a voice session is established between the chatbot and a customer while the customer is operating a vehicle device within a vehicle. A pre-staged order is taken from a customer during the session and the session is suspended until the customer arrives at a store associated with the pre-staged order. A location-based trigger is raised when the customer is detected as being present at a transaction terminal of a store; the session is resumed on the transaction terminal and/or the vehicle device. The pre-stage order is confirmed during the resumed session and payment is obtained from the customer for the order when payment was not already obtained from the customer. The order is sent to a fulfillment station and, in an embodiment, the items associated with the order are delivered to the customer while the customer remains at the terminal.

19 Claims, 5 Drawing Sheets

(56) References Cited

U.S. PATENT DOCUMENTS

| | | | |
|---|---|---|---|
| 2018/0090149 A1* | 3/2018 | Yamada | G06F 3/167 |
| 2020/0202260 A1* | 6/2020 | Kapadia | G06Q 10/1095 |
| 2021/0042724 A1* | 2/2021 | Rathod | G06Q 30/06 |

* cited by examiner

VOICE-BASED TRANSACTION PROCESSING WITH LOCATION-BASED ACTIVATION

BACKGROUND

Technology is substantially integrated into businesses and the everyday life of consumers. Businesses have added technology support to transact with their consumers over a variety of communication channels, some of which include consumer-operated devices.

In some environments even with existing technology item ordering, and item pickup can be problematic and inconvenient for the consumer. For example, when a consumer is purchasing fuel at a fuel pump of a convenience store, the user interface of the pump is typically small, hard to see at different times of the day, and usually has worn out entry keys or touchscreen displays. Furthermore, the consumer may have no idea as to what is available for purchase within the store beyond what is being actively advertised at the pump. The pump interfaces usually do not provide a complete item inventory or provide a searching mechanism for identifying a specific item. In fact, there is typically a limited list of items available within the store that the consumer can pre-purchase at the pump interface.

Moreover, although the consumer may be able to make a purchase from the less-than ideal user interface for a specific set of limited items, the consumer still must leave the pump to obtain the items from inside the store. This leaves the pump lane occupied while the consumer is purchasing something inside the store with the consumer's vehicle, thereby preventing other customers from accessing the consumer's pump lane. It is also extremely inconvenient for the consumer to move the vehicle to a new location on the premises for purposes of picking up a pre-purchased item or for purposes of browsing the store and purchasing items within the store. Convenience store lots are usually not very spacious, and maneuvering is difficult, particularly when the store and pumps are busy.

Additionally, consumers typically do not like to leave their vehicles for purposes of going into the store because this creates further delays. Moreover, if the consumer forgets to lock his/her vehicle, there is always a distinct possibility that someone may steal something from his/her vehicle, or even steal the vehicle itself.

Consequently, it is not surprising that research has revealed that consumers willing or desiring to make convenience store purchases often do not make purchases while refueling their vehicles. Business estimate that a substantial amount of lost sales occurs when consumers are refueling, because it appears more likely that convenience store purchasers are consumers that come into the store to purchase specific snacks, drinks, lottery tickets, and the like without also purchasing fuel.

SUMMARY

In various embodiments, methods and a system for voice-based transaction processing with location-based activation are provided.

According to an embodiment, a method for voice-based transaction processing with location-based activation is presented. A voice-based natural language session is established with a user who is operating a user device. A pre-staged order is obtained from the user during the voice-based natural language session. The voice-based natural language session is suspended until detection of a location-based trigger associated with the user device. The voice-based natural language session is resumed on a terminal based on the location-based trigger. Finally, the pre-staged order is completed as a completed transaction at the terminal during the voice-based natural language session.

DETAILED DESCRIPTION

Figure 1:
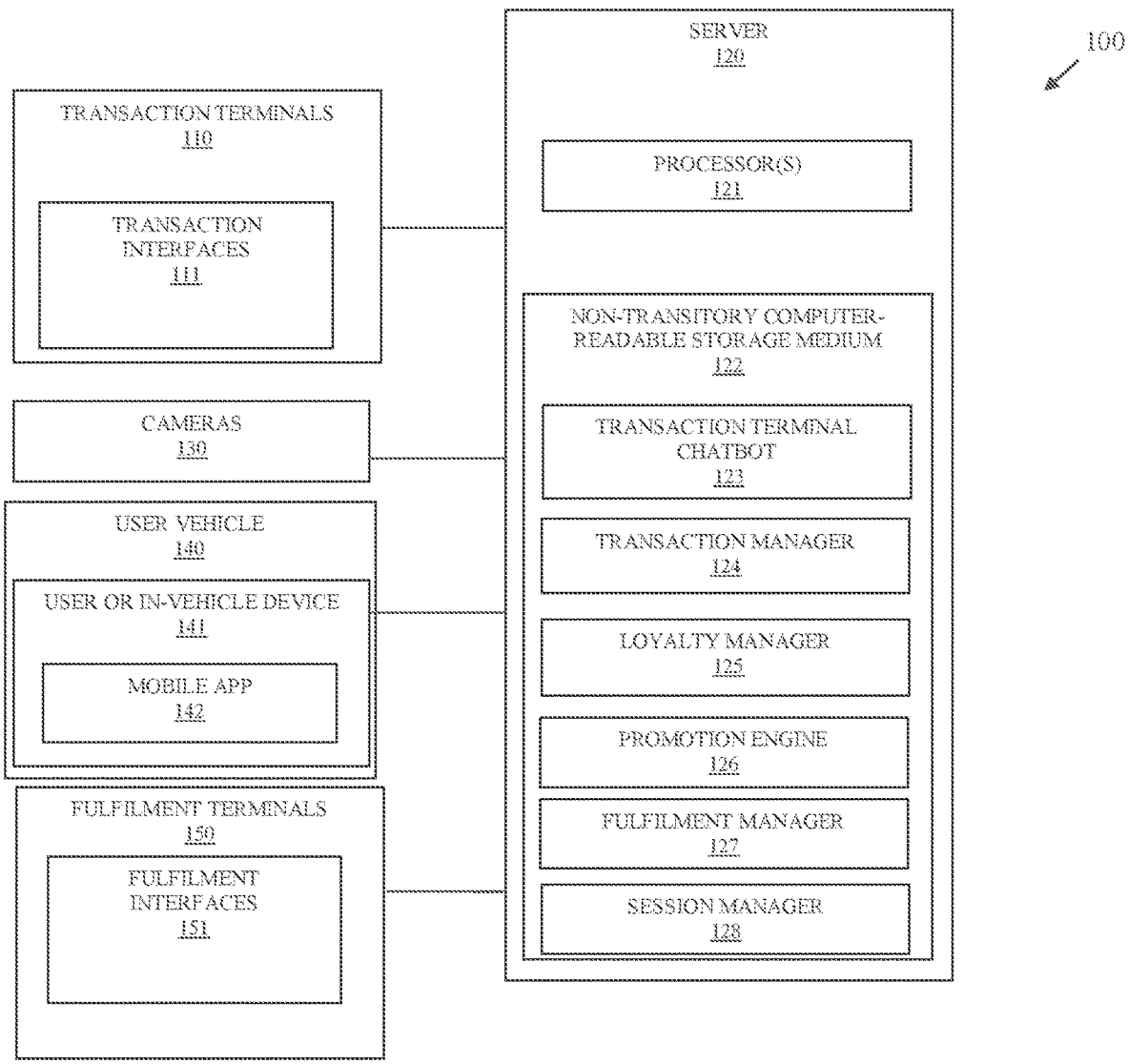
FIG. 1 is a diagram of a system for voice-based transaction processing with location-based activation, according to an example embodiment.

FIG. 1 is a diagram of a system 100 for voice-based transaction processing with location-based activation, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of voice-based transaction processing with location-based activation, presented herein and below.

As used herein and below, the terms "user," "consumer," "user," and "customer" may be used interchangeably and synonymously. The terms refer to an individual placing an order at a transaction terminal.

System 100 includes a plurality of processing devices and device types 110-150. The system 100 includes transaction terminals 110, a server 120, cameras 130, a user operated/in-vehicle device 141, and fulfillment terminals 150. Server 120 includes executable instructions that execute on one or more hardware processors 121 of server 120 from a non-transitory computer-readable storage medium 122 as: a transaction terminal chatbot 123, transaction manager 124, loyalty manager 125, promotion engine 126, fulfillment manager 127, and session manager 128.

It is to be noted that there may be multiple servers 120, such that the different elements 123-128 may execute on a same server 120 or multiple different servers 120 networked together. Furthermore, the server 120 may be a Local Area Network (LAN)-based server 120 or a Wide-Area Network (WAN)-based server 120.

In an embodiment, the server 120 is part of a cloud-processing environment that includes a plurality of servers logically cooperating of a network as a single accessible server 120.

Transaction terminals 110 include processors and non-transitory computer-readable storage media having executable instructions that when executed by the processor provide transaction interfaces 111.

User-operated/in-vehicle device 141 include processors and non-transitory computer-readable storage media having executable instructions that when executed by the processor provide mobile application (app) 142.

Fulfillment terminals 150 include processors and non-transitory computer-readable storage media having executable instructions that when executed by the processor provide fulfillment interfaces 151.

The components of the system 120 permit voice-based pre-staged order processing that migrates a natural language-initiated order to different devices as the consumer travels to fulfill the transaction when the customer arrives at a transaction terminal 110.

The natural language voice session/dialogue is performed by the transaction terminal chatbot 123 (hereinafter just "chatbot 123") through interaction with voice input provided by the customer through microphones associated with the device 141 and transaction terminal 110. The pre-staged order is automatically activated for processing to completion when the customer is geographically located in a predefined geofenced area of terminal 110. When the customer begins to operate terminal 110, the chatbot 123 reminds the customer of the pre-staged order, confirms that the customer still wants to proceed with the order, takes any modifications or additions to the order, causes the order to be fulfilled, and completes any needed payment processing on behalf of the customer. The items associated with the order are than delivered to the customer at terminal 110, available for pickup by the customer at a designated location, or available for pickup inside a store associated with terminal 110.

The pre-staged order processing and the transaction processing are provided as a single natural-language voice session/dialogue between the customer and the chatbot 123. The session is initiated when a customer pre-stages an order, and the pre-staged order is suspended until a location of the customer (detected from location information reported by app 142 to server 120) is determined to be within a predefined geographical range of terminal 110, at which time the session is revived, and a presence of the customer is monitored until the customer is determined to be present at terminal 110. The customer can then be automatically engaged in the continued natural-language voice session with the chatbot 123 at terminal 110 and/or through device 141 where fulfillment of the order can be initiated, if this were not already done based on the geographical range, and the customer can take possession of ordered items associated with the order.

When a customer initiates a pre-staged order with the chatbot 123 through device 141 utilizing app 142, a natural-language voice-based session is established and the chatbot 123 takes the order details. The location or store that the customer desires to pick-up the items can be identified by the customer through voice as well as an estimated time of arrival that the customer believes he/she will be at the store associated with terminal 110 for purposes of completing the transaction and obtain ordered items associated with the pre-staged order.

Moreover, the voice session/dialogue permits the customer to perform voice-based searches to discover items or services available at a store associated with terminal 110. The voice session/dialogue also permits the customer to: perform age-based verification when certain desired items are age-restricted (using cameras, card readers, or other peripheral devices associated with terminal 110 and/or device 141), perform loyalty operations, and perform payment processing for any ordered items. Additionally, during the voice session/dialogue, the customer may request and receive from chatbot 123 information and guidance relevant to the customer's current location.

Chatbot 123 performs voice-to-text translation of voice input received from the customer during the voice dialogue at terminal 110. The text is then processed to place a pre-staged order for items or services available at a store associated with terminal 110. The text drives actions and causes chatbot 123 to interact with: transaction manager 124 for transaction processing, loyalty manager 125 for loyalty-based processing, promotion engine 126 for promotion processing, fulfillment manager 127 for order fulfillment processing, and session manager 128 for determining when the customer is at terminal 110. Results or feedback from processing actions/operations with modules 124-128 are translated from text to speech (text-to-speech) and provided as audio feedback during the voice dialogue to the customer over a speaker associated with terminal 110 and/or a speaker integrated into device 141.

Transaction manager 124 may also interact with transaction interfaces 111 to update displayed information presented on displays of terminals 110 based on operations requested and driven by chatbot 123 during the voice dialogue. Similarly, fulfillment manager 127 may interact with fulfillment interfaces 151 to updated displayed information presented on displays of fulfillment terminals 150.

In some embodiments, chatbot 123 includes Application Programming Interfaces (APIs) that permit direct interaction with transaction interfaces 111 and fulfillment interfaces 151 independent of transaction manager 124 and fulfillment manager 127.

Chatbot 123 parses voice input supplied by the customer through a microphone of terminal 110, an integrated microphone of user device 141, and/or a microphone situated in proximity to but not entirely integrated within terminal 110. The audio is converted to text to identify an intention of the customer and identify actions/operations associated with 124-128. APIs of chatbot 123 then communicate the actions/operations to the appropriate modules 124-128. Results from the actions/operations are returned through the APIs as text. The text is then converted to natural language speech as audio and played over one or more of: a speaker integrated into terminal 110, a speaker integrated into user device 141, a headset wirelessly connected to user device 141, and a speaker that is no integrated into terminal 110 but is in proximity to terminal 110. Additionally, displayed information associated with the results from the actions/operations may be updated on display of terminal 110 through interfaces 111 by either chatbot 123 and/or transaction manager 124. Displayed information may also be simultaneously presented on device 141 through interaction with app 142. So, a context associated with the voice dialogue may be maintained visually on one or more displays of different devices (110 and 141) during the voice dialogue Spoken voice input may also be converted to text and displayed on any of the above-mentioned displays as feedback to the customer (so the customer can see when the customers speech was incorrectly converted to text by chatbot 123).

Initially, the customer engages the chatbot on device 141 through app 142 for purposes of placing a pre-staged order. During the pre-staged transaction dialogue, the chatbot determines the location of the customer (from location information reported by app 142), the location of a store associated with the items being ordered, the identity of the customer (through a loyalty account, a device identifier for device 141, and/or login information provided by app 142), any customer anticipated time of arrival at the store, and the items that are being pre-ordered by the customer. The chatbot 123 may also enroll the customer in a loyalty program associated with the store if it is determined that the customer is not an existing loyalty member of the store. Furthermore, the chatbot 123 may provide special deals and promotions associated with the store and provide interactive voice-based search of the item inventory available at the store.

The chatbot 123 confirms the specifics of the pre-staged order with the customer and may inform the customer as to whether certain ordered items will require customer identification and verification at the store, such as for items ordered requiring customer age verification (for buying alcohol, tobacco, lottery tickets, etc.). The chatbot 123 may also obtain from the customer an estimated time that the customer believes he/she will be arriving at the store with terminal 110. In some cases, the customer may instruct the chatbot 123 that the customer is headed directly to the store during the pre-stage ordering, such that the chatbot 123 can use routing services (through APIs) to calculate a time of arrival for the customer at the store based on the current reported location of device 141 along with a calculated route from that current location to the store location of the store.

Following the pre-stage ordering, the session is suspended or held in abeyance until the customer is detected within a predefined geographical rage (geofenced area) of the store. The session manager 128 is then used to monitor locations of device 141 on behalf of chatbot 123 and determines when the device 141 is within the geofenced area, when this occurs session manager 128 alerts chatbot 123.

Sensors/cameras 130 integrated into or in proximity to terminal 110 are then actively monitored to determine when the customer is at terminal 110. This can be done in a variety of manners, such as: image tracking of images captured by cameras 130, reporting by a card reader (contactless or swipe-based) of terminal 110 that a customer loyalty card or payment card was read, reporting by transaction interfaces 111 that a loyalty/customer identifying data was entered through a keypad or touchscreen of terminal 110, and/or a wireless beacon signal detected by app 142 and reported to server 120 (the beacon signal associated with terminal 110). Chatbot 123 may also engage the customer back in the session through app 142 and begin speaking to the customer through speakers associated with device 141.

In some cases, chatbot 123 may instruct the customer to enter a code displayed on a display of device 141 into terminal 110 using the terminal keypad or touchscreen display, transaction interfaces 111 report the terminal identifier where the code was entered to chatbot 123.

In some situations, chatbot 123 may instruct the customer to scan a Quick Response (QR) code or barcode affixed to terminal 110, to identify the specific terminal 110 where the customer is located. This can be audibly and visually communicated through the speakers and display of device 141 to the customer.

Once the customer is identified as being present at the terminal 110, chatbot 123 can engage the customer to complete processing of the pre-staged order. This engagement can occur through microphones and speakers associated with terminal 110 and/or through microphones and speakers associated with device 141.

For example, suppose the customer pre-staged an order at a convenience store 20 miles before arriving at the store and ordered a custom-food order from the deli of the store as well as some drinks (while the customer was traveling along the highway in his vehicle 140 using device 141 and app 142). Chatbot 123 identifies when the customer is at the store and detects the customer at a specific fuel pump associated with terminal 110. When the customer exits the vehicle and approaches the pump 110: chatbot 123 reminds the customer of the order and asks if he still wants the order. When the customer responds affirmatively, chatbot 123 causes the food and drink order to be sent to a store fulfillment terminal 150 and provides the customer's terminal 110 location. Chatbot 123 also completes the order by obtaining payment for the ordered food and drink from the customer, this can be done using the same payment card the customer is using to purchase fuel (assuming the food and drink order and fuel price does not exceed the hold placed on the card before the fuel pump was initiated), processed with a registered payment card of the customer, processed using a digital wallet application of the consumer, etc. A staff member runs the food and drink order out to the customer once the order is ready and delivers at the pump to the terminal.

Any customized food order can also be sent for fulfillment before arrival of the customer, assuming the customer pre-pays for the order. The timing for initiating the making of the customized order can be based on when the customer is anticipated to arrive (calculated as discussed above or provided by the customer during the pre-stage order) and based on an expected time needed to prepare the order by the store, such that the customized order is nearly immediately delivered to the customer when the customer arrives to fuel his/her vehicle 140 at pump 110.

Additionally, in some instances purchased items may necessitate by government regulation that the age of the customer be verified (such as when purchasing lottery tickets, alcohol, and tobacco products). In such cases, chatbot 123 may perform such verification in a variety of manners. For instance, chatbot 123 may ask the customer to present a government issued photo identification card to a camera integrated into terminal 110, a camera in proximity to terminal 110, or through an integrated camera of customer device 141 through mobile app 142. The necessary information to verify the age of the customer is then extracted from an image taken of the photo identification card and retailed by transaction manager 124 for any necessary governmental compliance.

Also, chatbot 123 may provide and redeem promotions during the dialogue by interaction through an API with promotion engine 126 and verbally informing the customer of promotions associated with the store or items of the store (which may or may not be related to items ordered by the customer during the dialogue).

Still further, chatbot 123 may provide other non-store related and non-order related services during the dialogue, such as directions to a restaurant near terminal 110, weather forecast, sport scores, stock prices, points-of-interest nearby terminal 110, and other services.

In an embodiment, chatbot 123 may dynamically move the voice and display based feedback from terminal 110 to device 141 upon request of the customer or based on preferences of the customer obtained from the loyalty account. Interaction, between customer and chatbot 123 proceeds through device 141. In an embodiment, the dialogue can be switched back and forth between terminal 110 and device 141 multiple times during the dialogue upon voice requests of the customer.

In an embodiment, transaction terminal 110 is a Self-Service Terminal (SST), an Automated Teller Machine (ATM), a kiosk, or a Fuel Pump.

In an embodiment, the preferences are used to customize the dialogue. The preferences are obtained from the loyalty account of the customer and the preferences may also be changed by the customer during the dialogue upon customer voice instructions made to chatbot 123. The preferences include, by way of example only, preferred spoken language of the customer, preferred payment method of the customer, preferred products of the customer, preferred price ranges for any of the preferred products, notifications that are to be provided when a product is available in inventory of a given store or falls below a customer-set price, preferred updates on news/sports scores/sports teams, preferred interaction device (terminal 110 or device 141), preferred method of receiving receipts (printed at terminal 110, emailed, texted, etc.), preferred restaurants, preferred foods, and others.

In an embodiment, user device 141 is a phone, a tablet, or a laptop, a wearable processing device, a portable Internet-of-Things (IoTs) device carried in a vehicle 140 of the customer, or a device integrated into the vehicle 140 of the customer.

In an embodiment, fulfillment terminals 150 are desktop computers, laptop computers, Point-Of-Sale (POS) terminals, tablets, phones, or wearable processing devices.

In an embodiment, the dialogue may be transcribed into text and sent as a text or email to the customer when the session ends, upon request of the customer.

In an embodiment, the chatbot 123 includes a trained machine-learning algorithm that is continuously learning and improving its spoken capabilities and accuracy for order processing.

In an embodiment, metrics are retained for the transaction and the dialogue for purposes of reporting and evaluating accuracy of marking campaigns, promotions, etc.

There are several variations on how the system 100 can operate, some of which are discussed above and some of which are more completely discussed below with the other FIGS. 2-5.

Figure 2:
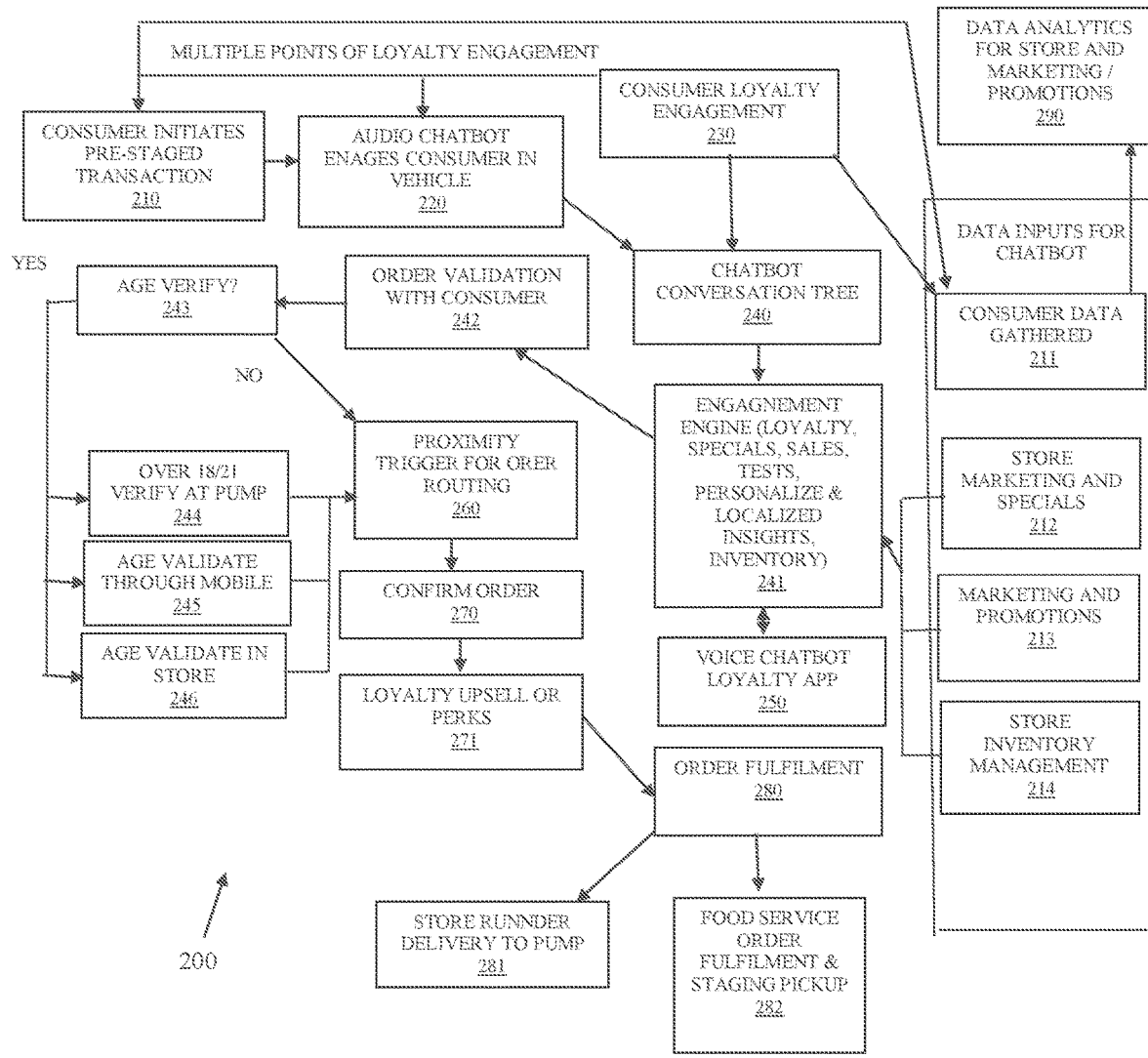
FIG. 2 is a diagram of processing associated with voice-based transaction processing with location-based activation, according to an example embodiment.

FIG. 2 is a diagram of processing associated with voice-based transaction processing with location-based activation processing of system 100, according to an example embodiment.

At 210, the consumer initiates a pre-staged transaction utilizing app 142 of device 141 to interact with chatbot 123 of server 120. This causes, at 220, the chatbot 123 to engage the customer over speakers and microphones associated with device 141 in a pre-stage ordering natural-language voice dialogue while the customer is in or traveling within his/her vehicle 140. Data inputs used by the chatbot are obtained as consumer-specific data 211, store marketing and specials 212, marketing and promotions 213, and store inventory management data 214.

Any loyalty information known for the customer, is obtained at 230 by the chatbot 123. Based on inputs 211-214 and 230, the chatbot forms a conversation tree at 240 using the information obtained as a context and knowledge store for the natural-language voice pre-stage ordering session. The customer is then engaged in the session at 241.

If it is detected that the customer is not enrolled in the loyalty program with the store, then, at 241, the chatbot 123 may provide a plug-in voice-based chatbot for enrolling the customer in the store's loyalty program at 250.

The order is validated with the customer at 242 and the customer is instructed as to whether any ordered items require age verification.

The session is then suspended or held in abeyance until the customer is detected as being located within a predefined geographical range (geofenced area) of the store.

If there is no age-based verification needed for the order, a proximity trigger may automatically trigger sending the customer's pre-staged order to a fulfillment station within the store when it is determined that based on a current location of device 141 traveling along an expected route coincides with an expected time of arrival and a length of time needed to fulfil the order.

At 260, the customer is identified at terminal 110 on the premises of the store. This detection of the customer can occur in any of the above-noted manners. The chatbot 123 resumes the session at 270 and again confirms the order with the customer. Any available loyalty upselling, perks, or offers are provided by the chatbot 123 through voice during the resumed session, at 271.

If age verification is needed, at 243, the chatbot may verify the age of the customer through any of the above-mentioned techniques, such as through the pump/terminal 110, at 244, through the mobile app 142 of device 141, at 245; or through instruction that the store requires the customer to come inside and manually verify his/her age, at 246.

The customer is then engaged by chatbot 123 through terminal 110 and/or through device 141 when the customer is detected as being presented at the pump/terminal 110. That is, the customer is free to walk to the pump/terminal 110 and remain actively engaged in the resumed session with the chatbot 123 or the customer may return to sit in his/her vehicle 140 and be engaged with chatbot 123 through device 141. In fact, the customer can move back and forth between the vehicle 140 and the pump/terminal 110 while maintaining the resumed session with chatbot 123.

Payment processing is performed by chatbot 123 during the resumed session (assuming payment was not pre-payed when the order was pre-staged). Payment can occur in any of the above-mentioned techniques and may be processed through device 141 or pump/terminal 110.

The order is sent to the order fulfillment station, at 280. When the order is ready for delivery, the items are delivered to the customer at the pump/terminal 110 at 281; or the customer is instructed by chatbot 123 that the items can be picked up in the store in a specific designated area, at 282.

At 280, data analytics for store and marketing/promotions presented, rejected, and/or accepted during the dialogue by chatbot 123 are captured and stored for evaluation of successes and for reporting.

These and other embodiments are now discussed with reference to the FIGS. 3-4.

Figure 3:
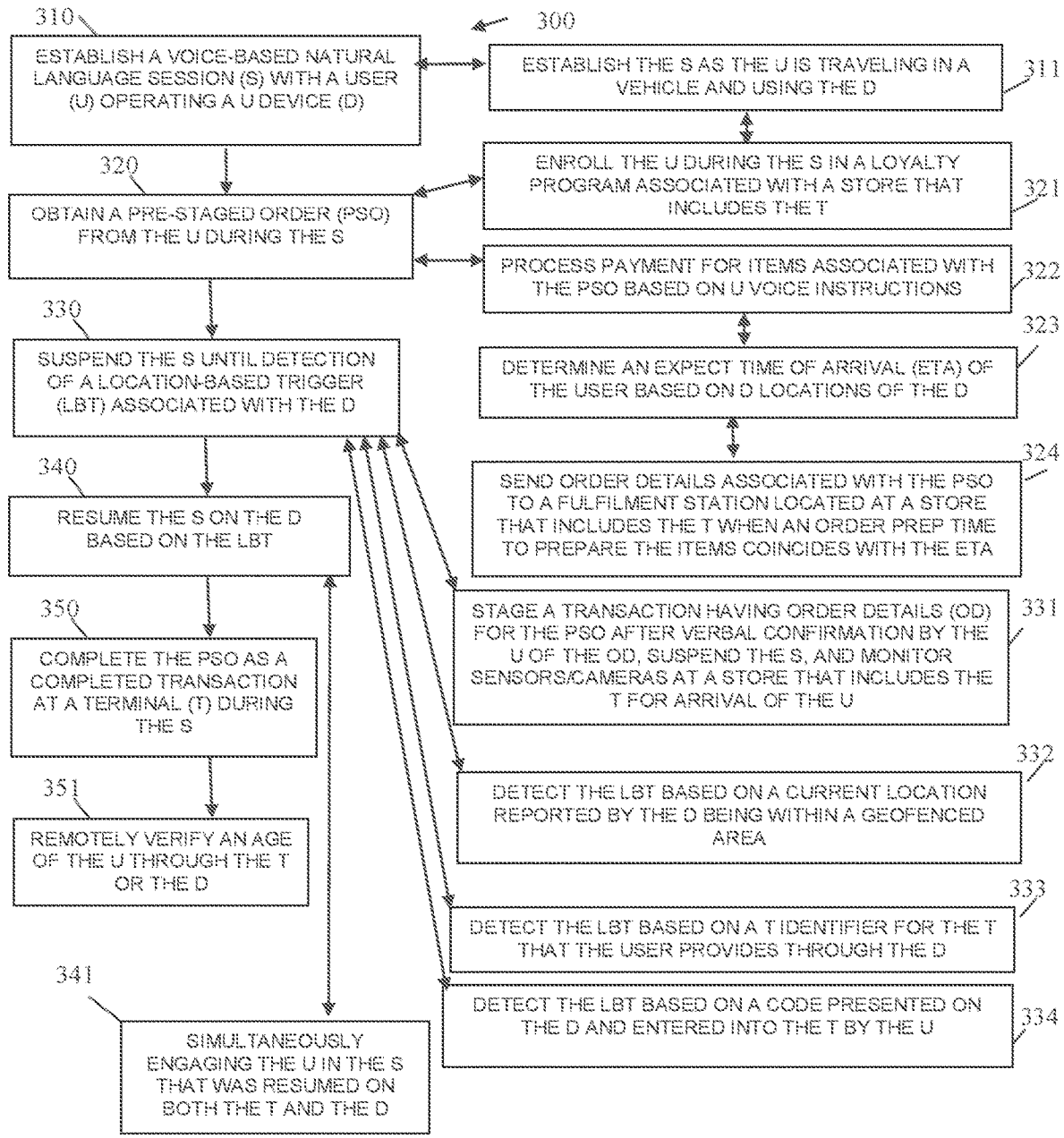
FIG. 3 is a diagram of a method for voice-based transaction processing with location-based activation, according to an example embodiment.

FIG. 3 is a diagram of a method 300 for voice-based transaction processing with location-based activation, according to an example embodiment. The software module(s) that implements the method 300 is referred to as a "transaction chatbot." The transaction chatbot is implemented as executable instructions programmed and residing within memory and/or a non-transitory computer-readable (processor-readable) storage medium and executed by one or more processors of a device. The processor(s) of the device that executes the transaction chatbot are specifically configured and programmed to process the transaction chatbot. The transaction chatbot may have access to one or more network connections during its processing. The network connections can be wired, wireless, or a combination of wired and wireless.

In an embodiment, the device that executes the transaction chatbot is the server 120. In an embodiment, the server 120 is a cloud-based processing environment comprising a collection of physical servers cooperating as a single logical server. In an embodiment, the server 120 is a Local-Area Network (LAN)-based server or a Wide-Area Network (WAN)-based server.

In an embodiment, the transaction chatbot is all or some combination of the chatbot 123, the transaction manager 124, the loyalty manager 125, the promotion engine 126, fulfillment manager 127, and/or the session manager 128.

At 310, the transaction chatbot establishes a voice-based natural language session with a user operating a user device.

In an embodiment, at 311, the transaction chatbot establishes the voice-based natural language session as the user is traveling in a vehicle and using or operating the user device. In an embodiment, the user device is a mobile device of the user. In an embodiment, the user device is integrated into the vehicle. In an embodiment, the user device is an IoTs device that is attached to a dashboard of the vehicle.

At 320, the transaction chatbot obtains a pre-staged order from the user during the voice-based natural language session. That is, the transaction chatbot utilizes app 142 of the user device along with a network connection to server 120, a microphone of the user device, and speakers of the user device to engage the user in taking order details for ordering items as a specified store.

In an embodiment of 311 and 320, at 321, the transaction chatbot enrolls the user, during the voice-based natural language session, into a loyalty program associated with the store. The store includes at least one transaction terminal. In an embodiment, the transaction chatbot may initiate a specialized store loyalty enrollment chatbot for enrolling the user into the loyalty program.

In an embodiment, at 322, the transaction chatbot processes payment for items associated with the pre-staged order based on user voice instructions provided in the voice-based natural language session. In this case, the user is prepaying for the items, rather, then delaying payment for the items when the items are received at the store.

In an embodiment of 322 and at 323, the transaction chatbot determines an expected time of arrival of the user based on device locations being reported by the user device That is, a routing service may be used to take current locations of the user device and map a route from those current locations to a store location for the store, and an expected time of arrival is determined therefrom.

In another case, during the pre-staged ordering the user may provide the transaction chatbot with the user's anticipated time of arrival at the store for picking up the pre-staged order.

In an embodiment of 323 and at 324, the transaction chatbot sends order details associated with the pre-staged order to a fulfillment station 150 located at the store that includes the terminal when an order prep time to prepare items of the order coincides with the expected time of arrival. That is, based on an estimated order prep time provided by the fulfillment station 150 and the expected time of arrival, the transaction chatbot can time submission of the order to the fulfillment station 150 to ensure the pre-staged order items are ready when the user arrives at the store. In cases where the items include prepared food, this also ensures the maximum freshness of the food items upon arrival of the user at the store.

At 330, the transaction chatbot suspends the voice-based natural language session until a detection of a location-based trigger associated with the user device is received.

In an embodiment, at 331, the transaction chatbot stages a transaction having order details for the pre-staged order after verbal confirmation by the user of the order details. The transaction chatbot then suspends the voice-based natural language session and monitors sensors/cameras at the store for identifying the location-based trigger through sensor/image data provided by the sensors/cameras to determine when the user arrives at the store and the transaction terminal of the store.

In an embodiment, at 332, the transaction chatbot detects the location-based trigger based on a current location reported by the user device being within a geofenced area associated with the store and/or the terminal of the store.

In an embodiment, at 333, the transaction chatbot detects the location-based trigger based on a terminal identifier for the terminal that the user provides through the user device. This can be through user action of using the user device to scan a OR code/barcode or user entering an identifier into an app interface of app 143 for the user device.

In an embodiment, at 334, the transaction chatbot detects the location-based trigger based on a code presented on the user device that the user enters the terminal through a keypad of the terminal or a touchscreen interface. The code is provided by the transaction chatbot to the user either verbally, through text message, and/or through app 143. When the user enters the unique code on the terminal, the terminal reports the code to the transaction chatbot along with its transaction terminal identifier.

At 340, the transaction chatbot resumes the previously suspended voice-based natural language session with the user on at least the user device based on detection of the location-based trigger. That is, the session is restarted automatically and initiated by the transaction chatbot. The session may also be additionally migrated to the terminal and its speakers, microphones, display.

In an embodiment, at 341, the transaction chatbot simultaneously engages the user in the voice-based natural language session on both the user device and the terminal. That is, through the app 143, the user is proactively engaged while the user remains in the car and the user is reminded about the pre-staged order, as the user exits the car and approaches the terminal, the session is continued with the user with the transaction chatbot utilizing speakers, microphones, and the display of the terminal to engage the user regarding the pre-staged order and its details. The user can make changes to the order during this resumed session engagement.

At 350, the transaction chatbot completes the pre-staged order as a completed transaction at the terminal during the resumed session. This may include obtaining any needed payment from the user for ordered items of the order (assuming payment was not previously pre-paid by the user during the pre-stage ordering).

In an embodiment, at 351, the transaction chatbot remotely verifies an age of the user through the terminal or the user device when items of the order necessitate age verification of the user (such as when the customer is buying alcohol, tobacco, lottery tickets, etc.). This can be done utilizing cameras associated with the terminal and/or the user device to capture a picture of a photo identification card presented by the user or can be done through a remote agent that can see the user and confirms the user is over a predefined age on visual inspection. In fact, other remote verification techniques may be used as well.

Figure 4:
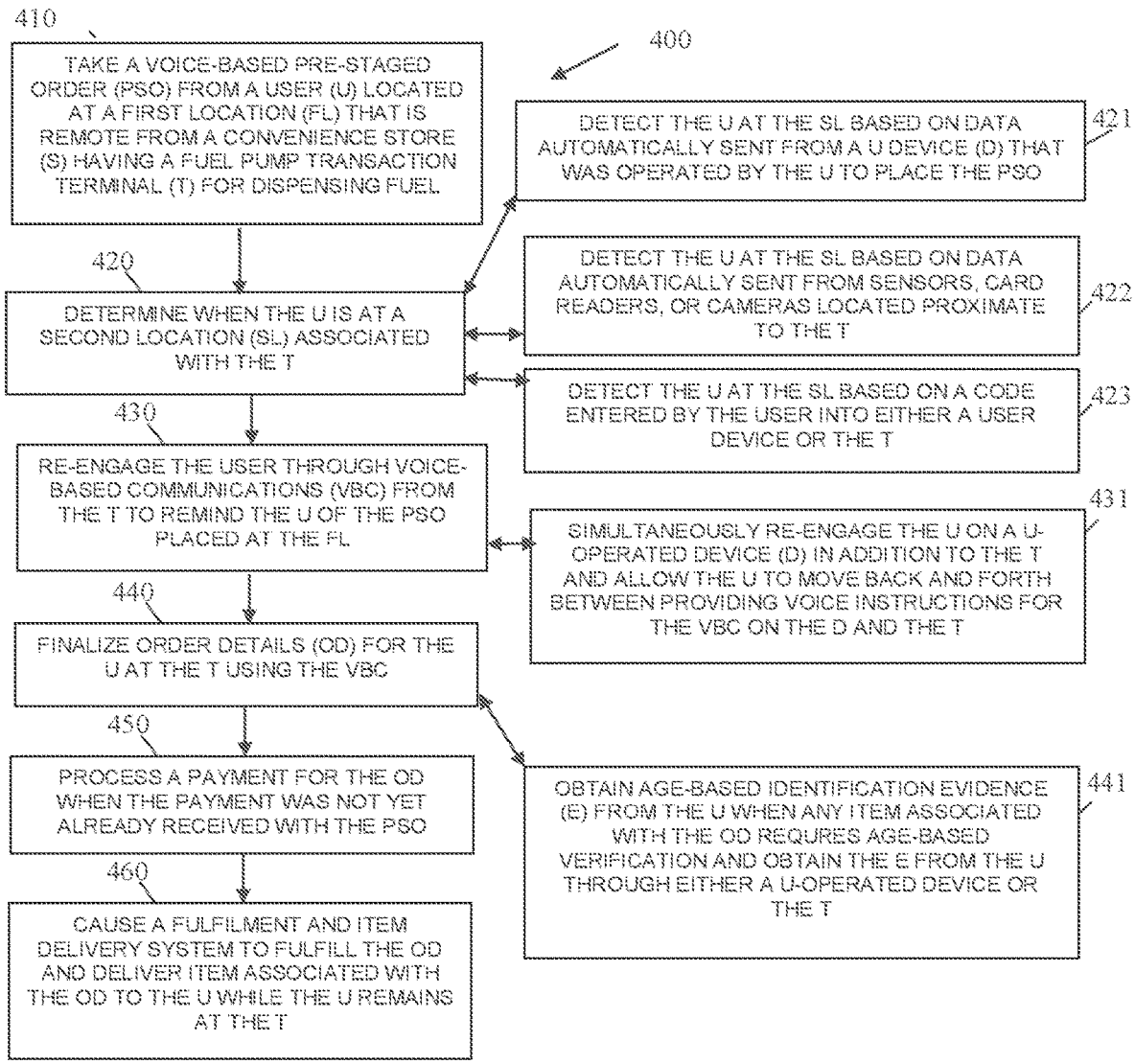
FIG. 4 is a diagram of another method for voice-based transaction processing with location-based activation, according to an example embodiment.

FIG. 4 is a diagram of another method 400 for voice-based transaction processing with location-based activation according to an example embodiment. The software module(s) that implements the method 400 is referred to as a "speech and location-based transaction manager." The speech and location-based transaction manager is implemented as executable instructions programmed and residing within memory and/or a non-transitory computer-readable (processor-readable) storage medium and executed by one or more processors of a device. The processors that execute the speech and location-based transaction manager are specifically configured and programmed to process the speech and location-based transaction manager. The speech and location-based transaction manager may have access to one or more network connections during its processing. The network connections can be wired, wireless, or a combination of wired and wireless.

In an embodiment, the device that execute the speech and location-based transaction manager is the server 120. In an embodiment, the server 120 is a cloud processing environment, a LAN server, or a WAN server.

In an embodiment, the speech and location-based transaction manager is all of, or some combination of: chatbot 123, transaction manager 124, loyalty manager 125, promotion engine 126, fulfillment manager 127, the session manager 128, and/or the method 300.

The speech and location-based transaction manager presents another and, in some ways, enhanced processing perspective of the method 300.

At 410, the speech and location-based transaction manager takes or processes a voice-based pre-staged order from a user that is located at a first location, which is remote from a convenience store having at least one fuel pump transaction terminal for dispensing fuel.

At 420, the speech and location-based transaction manager determines when the user is at a second location associated with the fuel pump transaction terminal.

In an embodiment, at 421, the speech and location-based transaction manager detects the user is at the second location based on data automatically sent from a user device that was operated by the user when placing the verbal order at 410.

In an embodiment, at 422, the speech and location-based transaction manager detects the user is at the second location based on data automatically sent from sensors, card readers, or cameras that are located proximate to the fuel pump terminal.

In an embodiment, at 423, the speech and location-based transaction manager detects the user is at the second location based on a code entered by the user into either a user device or the fuel pump terminal.

At 430, the speech and location-based transaction manager re-engages the user through voice-based communications from the fuel pump terminal to remind the user of the pre-stage order placed at the first location.

In an embodiment, at 431, the speech and location-based transaction manager simultaneously re-engages the user on the user-operated device in addition to the fuel pump terminal and allows the user to move back and forth between providing voice instructions for the voice-based communications on the user device and the fuel pump terminal.

At 440, the speech and location-based transaction manager finalizes order details for the user at the fuel pump terminal using the voice-based communications on either the fuel pump terminal or the user operated device.

In an embodiment, at 441, the speech and location-based transaction manager obtains age-based identification evidence from the user when any item associated with the order details requires age-based verification and the speech and location-based transaction manager obtains the evidence from the user through either the user-operated device or the fuel pump terminal.

At 450, the speech and location-based transaction manager processes a payment for the order details when the payment was not yet already received from the user with the pre-staged order at 410.

At 460, the speech and location-based transaction manager causes a fulfillment and item delivery system to fulfill the order details and deliver the items associated with the order details to the user while the user remains at the fuel pump terminal refueling the user's vehicle.

In an embodiment, the speech and location-based transaction manager may verbally instruct the user to go inside of the store to a designated location for item pickup of the order when at-pump delivery is unavailable at the store for any of a variety of reasons.

Figure 5:
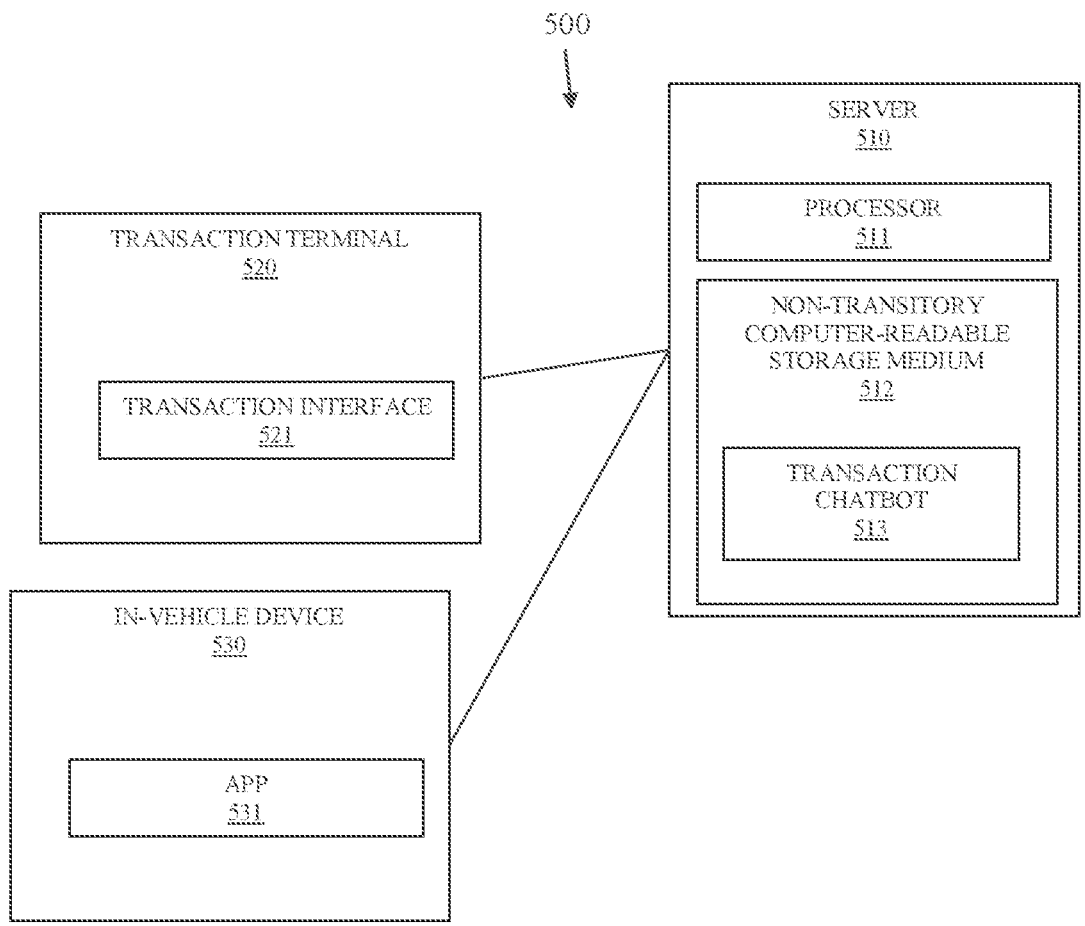
FIG. 5 is a diagram of another system for voice-based transaction processing with location-based activation, according to an example embodiment.

FIG. 5 is a diagram of a system 500 for voice-based transaction processing with location-based activation, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes a server 510 having a processor 511 and non-transitory computer-readable storage media 502 having executable instructions representing a transaction chatbot 513. The system 500 also includes transaction terminal 520 having a transaction processor and a transaction non-transitory computer-readable storage medium including executable instructions representing a transaction interface 521. Still further, the system 500 also includes in-vehicle device 530 having a device processor and a device non-transitory computer-readable storage medium including executable instructions representing an application (app) 531.

In an embodiment, server 510 is server 120. In an embodiment, server 120 is a cloud-based server, a LAN-based server, or a WAN-based server.

In an embodiment, terminal 520 is terminal 110. In an embodiment, terminal 110 is a SST, a kiosk, an ATM, or a fuel pump (as discussed in the FIG. 2).

In an embodiment, in-vehicle device 530 is: a device integrated into vehicle 140, a mobile phone, a tablet, a laptop, a wearable processing device, or an IoTs device.

In an embodiment, transaction chatbot 513 is all or some combination of the chatbot 123, transaction manager 123, loyalty manager 125, promotion engine 126, fulfillment manager 127, session manager 128, the processing discussed in the FIG. 2, the method 200, and/or the method 300.

In an embodiment, transaction interface 521 is transaction interface 111.

In an embodiment, app 531 is app 142.

The transaction chatbot 513 when executed by the processor 511 from the non-transitory computer-readable storage medium 513 causes the processor 511 to: 1) initiate a natural-language voice session with the consumer through the application 531 to obtain a pre-staged order from the consumer on the in-vehicle device 530; 2) interact with the in-vehicle device 530 or the transaction terminal 520 to determine when the consumer is located at the transaction terminal 520; 3) re-establishing the natural-language session with the user through at least the transaction terminal 520 to confirm and initiate the pre-staged order with a fulfillment system while interacting with the transaction manager 521; and 4) interact with the transaction manager 521 to complete a transaction associated with fulfilling the pre-staged order at the transaction terminal 520.

Transaction interface 521 when executed by terminal processor from terminal non-transitory computer-readable storage medium causes the terminal processor to: 1) interact with the transaction chatbot 513 during the natural-language voice session; and 2) present a text-based representation of the natural-language voice session as feedback on a display of the transaction terminal 520 based on text data and instructions provided by the transaction chatbot.

App 531 when executed by device processor from device non-transitory computer-readable storage medium causes the device processor to: 1) interact with the transaction chatbot 513 during the natural language voice session; and 2) present the text-based representation of the natural-language voice session as additional feedback on an in-vehicle display of the in-vehicle device 530 based on the text data and the instructions provided by the transaction chatbot 513.

In an embodiment, the transaction chatbot 513 when executed by the processor 511 from the non-transitory computer-readable storage medium 512 is further configured to cause the processor 511 to: verbally communicate and redeem promotions provided by the store during the natural language voice session with the consumer through either the in-vehicle device 530 and/or the transaction terminal 520.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    establishing a voice-based natural language session with a user who is operating a user device;
    obtaining a pre-staged order from the user during the voice-based natural language session suspending the voice-based natural language session until detection of a location-based trigger associated with the user device, suspending further includes staging a transaction having order details for the pre-staged order after verbal confirmation by the user of the order details, suspending the voice-based natural language session, and monitoring sensors/cameras at a store that includes the terminal for arrival of the user;
    resuming the voice-based natural language session on the user device based on the location-based trigger; and
    completing the pre-staged order as a completed transaction at a terminal during the voice-based natural language session.

2. The method of claim 1, wherein establishing further includes establishing the voice-based natural language session as the user is traveling within a vehicle and using the user device.

3. The method of claim 2, wherein obtaining further includes enrolling the user during the voice-based natural-language session in a loyalty program associated with a store that includes the terminal.

4. The method of claim 1, wherein obtaining further includes processing payment for items associated with the pre-staged order based on voice instructions provided by the user.

5. The method of claim 4, wherein processing further includes determining an expected time of arrival of the user based on device locations reported by the user device.

6. The method of claim 5, wherein determining further includes sending order details associated with the pre-staged order to a fulfilment station located at a store that includes the terminal when an order prep time for preparing the items coincides with the expected time of arrival of the user.

7. The method of claim 1, wherein resuming further includes detecting the location-based trigger based on a current location reported by the user device being within a geofenced area.

8. The method of claim 1, wherein resuming further includes detecting the location-based trigger based on a terminal identifier for the terminal that the user provides through the user device.

9. The method of claim 1, wherein resuming further includes detecting the location-based trigger based on a code presented on the user device and entered into the terminal by the user.

10. The method of claim 1, wherein resuming further includes simultaneously engaging the user in the voice-based natural language session that was resumed on both the terminal and the user device.

11. The method of claim 1, wherein completing further includes remotely verifying an age of the user through the terminal or the user device.

12. A method, comprising:
    taking a voice-based pre-staged order from a user located at a first location that is remote from a convenience store having a fuel pump transaction terminal for dispensing fuel;
    determining when the user is located at a second location associated with the fuel pump transaction terminal;
    re-engaging the user through voice communications from the fuel pump transaction terminal to remind the user of the voice-based pre-staged order placed at the first location;
    finalizing order details for the user at the fuel pump transaction terminal using the voice communications;
    processing a payment for the order details when the payment was not yet already received with the voice-based pre-staged order; and
    causing a fulfilment and item delivery system to fulfill the order details and deliver items associated with the order details to the user while the user remains at the fuel pump transaction terminal.

13. The method of claim 12, wherein determining further includes detecting the user at the second location based on data automatically sent from a user device that was operated by the user to place the voice-based pre-stage order.

14. The method of claim 12, wherein determining further includes detecting the user at the second location based on data automatically sent from sensors, card readers, or cameras located proximate to the fuel pump transaction terminal.

15. The method of claim 12, wherein determining further includes detecting the user at the second location based on a code entered by the user into either a user device or the fuel pump transaction terminal.

16. The method of claim 12, wherein re-engaging further includes simultaneously re-engaging the user on a user-operated device in addition to the fuel pump transaction terminal and allowing the user to move back and forth between providing voice instructions for the voice-based communications on the user-operated device and the fuel pump transaction terminal.

17. The method of claim 12, wherein finalizing further includes obtaining age-based identification evidence from the user when any item associated with the order details requires age-based verification and obtaining the age-based identification evidence from either a user-operated device or the fuel pump transaction terminal.

18. A system, comprising:
a server comprising a processor and a non-transitory computer-readable storage medium having executable instructions representing a transaction chatbot;
a transaction terminal comprising a terminal processor and a terminal non-transitory computer-readable storage medium having executable instructions representing a transaction interface;
a in-vehicle device comprising a device processor and a device non-transitory computer-readable storage medium having executable instructions representing an application;
the transaction chatbot when executed by the processor from the non-transitory computer-readable storage medium is configured to cause the processor to:
  initiate a natural-language voice session with the consumer through the application to obtain a pre-staged order from the consumer on the in-vehicle device;
  interact with the in-vehicle device or the transaction terminal to determine when the consumer is located at the transaction terminal;
  re-establishing the natural-language session with the consumer through at least the transaction terminal to confirm and initiate the pre-staged order with a fulfilment system while interacting with the transaction manager; and
  interact with the transaction manager to complete a transaction associated with fulfilling the pre-staged order at the transaction terminal;
the transaction interface when executed by the transaction processor from the transaction non-transitory computer-readable storage medium is configured to cause the transaction processor to:
  interact with the transaction chatbot during the natural-language voice session; and
  present a text-based representation of the natural-language voice session as feedback on a display of the transaction terminal based on text data and instructions provided by the transaction chatbot;
the application when executed by the device processor from the device non-transitory computer-readable storage medium is configured to cause the device processor to:
  interact with the transaction chatbot during the natural language voice session; and
  present the text-based representation of the natural-language voice session as additional feedback on an in-vehicle display of the in-vehicle device based on the text data and the instructions provided by the transaction chatbot.

19. The system of claim 18, the transaction chatbot when executed by the processor from the non-transitory computer-readable storage medium is further configured to cause the processor to:
verbally communicate and redeem promotions provided by a store associated with the transaction terminal during the natural language voice session with the consumer from either the in-vehicle device of the transaction terminal.

* * * * *